(12) United States Patent
Froeberg

(10) Patent No.: US 6,898,517 B1
(45) Date of Patent: May 24, 2005

(54) VEHICLE-BASED DYNAMIC ADVERTISING

(75) Inventor: Peter L. Froeberg, Cupertino, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 09/915,110

(22) Filed: Jul. 24, 2001

(51) Int. Cl.[7] ............................................. G01C 21/26
(52) U.S. Cl. ...................... 701/207; 701/211; 701/213; 340/990; 340/995.17; 340/995.27; 340/691.6; 342/357.17; 455/412.2; 455/414.3; 455/456.3
(58) Field of Search ........................... 701/23–26, 211, 701/214–216, 207, 208, 209, 213; 455/412.1, 412.2, 414.1, 414.2, 456.1, 456.3, 456, 517, 566; 340/995.13, 995.17, 995.27, 7.48, 7.55, 988, 990, 991, 992, 995, 996, 7.51, 7.43, 7.62, 7.53, 7.64; 705/14, 26–27; 342/357.06, 357.09, 357.1, 357.17

(56) References Cited

U.S. PATENT DOCUMENTS

| | | | | |
|---|---|---|---|---|
| 5,627,549 A | * | 5/1997 | Park ............................ | 340/996 |
| 5,664,948 A | * | 9/1997 | Dimitriadis et al. ... | 324/207.26 |
| 5,914,654 A | * | 6/1999 | Smith ........................ | 235/384 |
| 6,060,993 A | * | 5/2000 | Cohen ....................... | 340/425.5 |
| 6,122,850 A | * | 9/2000 | Strzeletz .................... | 40/558 |
| 6,127,969 A | * | 10/2000 | Van Roekel .......... | 342/357.113 |
| 6,163,751 A | * | 12/2000 | Van Roekel ............... | 701/210 |
| 6,308,133 B1 | * | 10/2001 | Loffert et al. ............... | 701/211 |
| 6,332,127 B1 | * | 12/2001 | Bandera et al. ............... | 705/14 |
| 6,349,263 B1 | * | 2/2002 | Green et al. ................. | 701/213 |
| 6,366,856 B1 | * | 4/2002 | Johnson ...................... | 701/213 |
| 6,414,602 B2 | * | 7/2002 | Polyakov ................. | 340/691.6 |
| 6,430,505 B1 | * | 8/2002 | Green ........................ | 701/214 |
| 6,442,473 B1 | * | 8/2002 | Berstis et al. ............... | 701/117 |
| 6,529,827 B1 | * | 3/2003 | Beason et al. .............. | 701/213 |
| 6,529,828 B1 | * | 3/2003 | Williams et al. ............ | 701/213 |
| 6,587,788 B1 | * | 7/2003 | Green ........................ | 701/213 |
| 2001/0052841 A1 | * | 12/2001 | Polyakov ................... | 340/7.48 |
| 2002/0006800 A1 | * | 1/2002 | Mohi ......................... | 455/457 |
| 2002/0032035 A1 | * | 3/2002 | Teshima ..................... | 455/456 |
| 2002/0069017 A1 | * | 6/2002 | Schmier et al. ............. | 701/213 |
| 2002/0198653 A1 | * | 12/2002 | Lutter ........................ | 701/209 |

FOREIGN PATENT DOCUMENTS

| | | | | | |
|---|---|---|---|---|---|
| JP | 11259031 A | * | 9/1999 | ........... | G09F/21/04 |
| JP | 11259031 | * | 9/1999 | ........... | G09F/21/04 |

* cited by examiner

Primary Examiner—Jacques H. Louis-Jacques

(57) ABSTRACT

A method and system for dynamically targeting content (e.g., advertising) displayed by a moving vehicle according to the location and direction of travel of the vehicle. Multiple items of content are loaded onto the vehicle and updated at periodic intervals. Position information (such as Global Positioning System information) is used to determine the location and direction of travel of the vehicle. Using the vehicle's position and direction of travel, and perhaps the time of day, a particular item of content can be selected and displayed to an audience external to the vehicle. The amount of time each particular item of content is displayed can be measured and used as the basis for billing clients.

12 Claims, 4 Drawing Sheets

VEHICLE-BASED DYNAMIC ADVERTISING

TECHNICAL FIELD

The present invention relates to the field of position determination systems. Specifically, the present invention pertains to a method for using a position determination system with a moving vehicle to target mobile advertisements and other content according to spatial parameters.

BACKGROUND ART

It is common for advertisers to place advertisements and other messages ("content") in advertising spaces at fixed locations, such as billboards or on buildings. The content is periodically changed at the discretion of the advertiser, or at the discretion of the person leasing the advertising space. The effectiveness of the content depends largely on the number of people who see it, as well as the relevance of the content to the people who see it.

To allow more people to see an advertisement, advertisements are also commonly placed on moving vehicles such as buses, taxicabs, and the like. In fact, trucks with the sole purpose of serving as mobile billboards are becoming more common. By making the advertisement mobile, not only are more people able to see it, but advertisements can also be delivered to areas that might otherwise be unreachable because of advertising restrictions or prohibitive costs.

Recently, mobile advertisers have been employing position determination methods, such as methods based on the US Global Positioning. System (GPS), to document the penetration of each particular advertisement. Satellite positioning system (SATPOS) devices that determine position using GPS satellites are quite effective for indicating the position of marine vessels, land vehicles, airplanes, and other such crafts and conveyances that can serve as a mobile billboard. By tracking and logging the location of a mobile advertisement as a function of time, the provider of such services can determine where and when a particular advertisement was on display and bill the client accordingly.

A shortcoming associated with some prior art implementations is that a billboard or advertisement affixed to a vehicle cannot be changed en route. Consequently, the content provided is infrequently changed and relatively static. Also, because the content may not be relevant to the people viewing it, the effectiveness of the advertisement is likely reduced.

Alternatively, a dynamic advertising method can be used instead of static advertising. That is, the content that is displayed can be changed en route as a function of time using, for example, rotating panels or other types of well known changeable displays. In this case, the content displayed is selected from a number of available advertisements preloaded onto the mobile advertising vehicle.

Even with the use of dynamic advertising, the prior art remains problematic because the advertisements are generally changed according to a fixed schedule without regard to the audience that may be present. Accordingly, the content being displayed may not be relevant to the people who are viewing it and, as a result, the effectiveness of the advertisement is reduced.

Not only is the advertisement itself perhaps wasted, but the opportunity to provide a more relevant advertisement is lost. Advertising revenues typically depend on the effectiveness of the content, which in turn is dependent on the ability to reach a target group of people for which the content is especially relevant. Consequently, potential income to providers of advertising services can be lost if they do not have the capability to effectively match advertisements to different target groups.

Therefore, what is needed is a system and/or method that can more effectively target advertisements and other content provided by mobile advertisers. The present invention provides a novel solution to this need.

DISCLOSURE OF THE INVENTION

The present invention provides a method and system that can more effectively target advertisements and other content provided by mobile advertisers.

The present embodiment of the present invention pertains to a method and system for dynamically targeting content (e.g., advertising) that is displayed by a moving vehicle according to the location of the vehicle. Multiple items of content are loaded onto the vehicle and updated at periodic intervals. Position information (such as Global Positioning System information) is used to determine the location of the vehicle. In one embodiment, the direction of travel of the vehicle can also be determined from the position information.

In the present embodiment, based on the vehicle's position, a particular item of content can be selected and displayed to an audience external to the vehicle. In one embodiment, the vehicle's direction of travel can also be used as the basis for selecting a particular item of content. In another embodiment, the time of day can also be used to select a particular item of content.

In one embodiment, the amount of time each particular item of content is displayed can be measured and used as the basis for billing clients.

The present invention thus introduces new dimensions to the concept of mobile advertising. In accordance with the present invention, content (advertisements, messages and the like) can be more precisely targeted by location, direction of travel and/or time of day, making the content more relevant to the viewing audience and therefore more effective.

These and other objects and advantages of the present invention will no doubt become obvious to those of ordinary skill in the art after having read the following detailed description of the preferred embodiments that are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Figure 1:
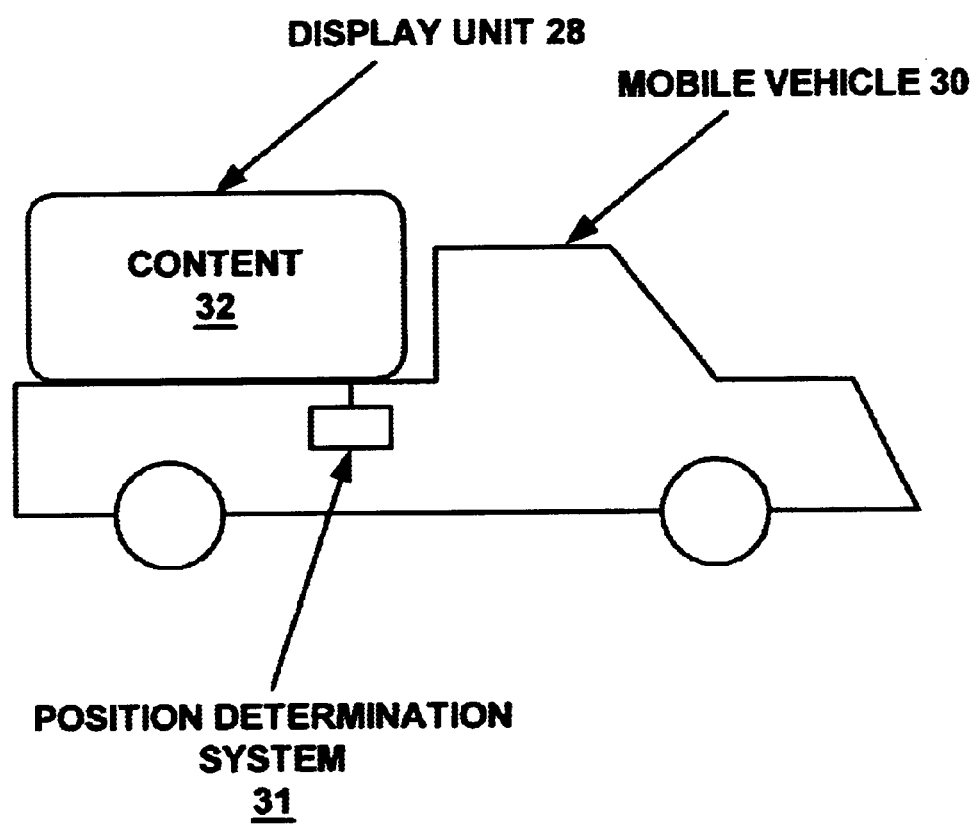
FIG. 1 is a side-perspective view illustrating one embodiment of a mobile vehicle with an externally viewable display unit in accordance with the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as to not unnecessarily obscure aspects of the present invention.

Notation and Nomenclature

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "selecting" or "displaying" or "measuring" or "determining" or "loading" or "using" or "updating" or "receiving" or the like, refer to the actions and processes of a computer system (e.g., process 400 of FIG. 4), or similar electronic computing device, that manipulates and transforms data represented as physical (electronic) quantities within the computer system's registers and memories into other data similarly represented as physical quantities within the computer system memories or registers or other such information storage, transmission or display devices.

In the present embodiment, reference to a satellite position determination system, or "SATPOS" herein, refers to a Global Positioning System (GPS), to a Global Orbiting Satellite System (GLONASS), and to any other positioning system, including pseudolites, that provide signals that can be used to determine position. The terms "satellite position determination system" and "SATPOS," as used herein, are intended to include position determination using pseudolites or equivalents of pseudolites, and the terms "satellite position determination system signals" and "SATPOS signals," as used herein, are intended to include position determination system-like signals and data from pseudolites or equivalents of pseudolites. Also, signals from other sources such as LORAN, Wide Area Augmentation System (WAAS) satellites, etc., may be used to determine position.

FIG. 1 is a side-perspective view illustrating one embodiment of a mobile vehicle 30 with an externally viewable display unit 28 in accordance with the present invention. Display unit 28 displays content 32 (an advertisement, message, alert, or the like) to a viewing audience that is positioned external to mobile vehicle 30. Display unit 28 can display content 32 which is changed as a function of spatial parameters (e.g., position and/or direction of travel of mobile vehicle 30) and/or temporal parameters. That is, the content 32 can be changed from one message to another while mobile vehicle 30 is en route, based on the vehicle's position and/or direction of travel, the time of day, and/or other factors.

For example, display unit 28 may use rotating panels to display different messages at different locations or at different times. Alternatively, display unit 28 may use different combinations of lights to spell out different messages. In other embodiments, the display unit 28 may be a liquid crystal display device, a cathode ray tube (CRT), a field emission display device (also called a flat panel CRT), a thin film transistor (TFT) display device, an electro-luminescent display device, a plasma display device, or another type of display device, electronic and otherwise, suitable for generating graphic images and alphanumeric characters for displaying messages.

It will be apparent to one of ordinary skill in the art that, in one embodiment, a audio unit capable of broadcasting an audible message can be used in combination with or instead of the display unit 28. The content 32 may thus also include a pre-recorded audible message, or the audible message may be generated using any of the various techniques and software programs available for converting text to voice.

Although FIG. 1 depicts a particular type of mobile vehicle 30, it is appreciated that mobile vehicle 30 can be any mobile platform capable of displaying content 32. Accordingly, mobile vehicle 30 may be a land vehicle such as a taxicab, bus, or mobile billboard (a truck with the sole purpose of carrying display unit 28), a marine vessel, or an airborne craft such as a blimp, airplane, or the like. In general, mobile vehicle 30 has the following attributes: the ability to display textual or graphical content; the ability to change the display from one item of content to another en route; and the ability to determine the vehicle's position (e.g., latitude, longitude, and direction of travel) as well as its speed and the time of day.

In the present embodiment, mobile vehicle 30 includes a position determination system 31 coupled to display unit 28. In one embodiment, position determination system 31 is used to determine the location of mobile vehicle 30. In another embodiment, position determination system 31 is also used to determine the direction of travel of mobile vehicle 30. Position determination system 31 can also be used to determine the time of day, although it is appreciated that other mechanisms may be used instead. The speed of mobile vehicle 30 can be either determined using conventional means (e.g., a speedometer) or derived using position determination system 31.

Vehicle Position Determination System

Figure 2:
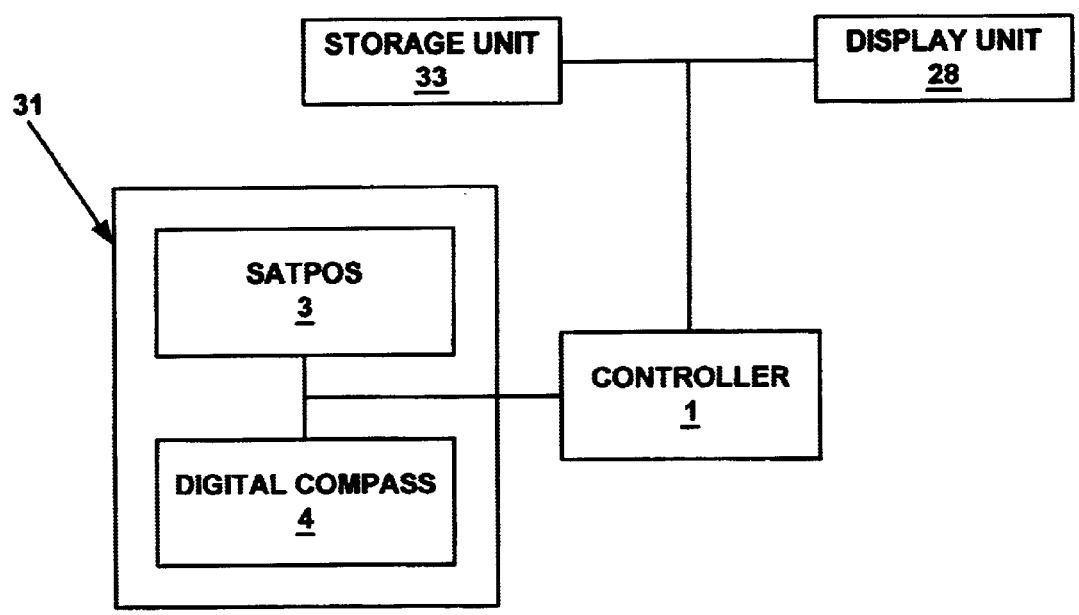
FIG. 2 is a block diagram of one embodiment of a position determination system for vehicle-based dynamic advertising in accordance with the present invention.

FIG. 2 is a block diagram of one embodiment of a position determination system 31 for dynamic advertising in accordance with the present invention. In the present embodiment, position determination system 31 includes Satellite Positioning System (SATPOS) 3 that is operable for determining position. In one embodiment, SATPOS 3 is adapted to determine position using a Satellite Positioning System such as the US Global Positioning System (GPS).

In the GPS embodiment, SATPOS 3 determines its location by analysis of satellite position determining signals such as signals from satellites of the US GPS. In one embodiment, position signal processing circuitry in SATPOS 3 also determines the direction of movement of SATPOS 3, also referred to as the heading, and couples the determined heading to controller 1. In this embodiment, direction of movement is determined by comparing satellite position determining signals received as the position determination system 31 moves.

In another embodiment, position determination system 31 also includes digital compass 4. Digital compass 4 is operable to determine direction and couple direction to controller 1. More particularly, in the present embodiment, digital compass 4 determines the compass direction that corresponds to the orientation of position determination system 31.

Continuing with FIG. 2, controller 1 controls the operation of position determination system 31. In one embodiment, controller 1 is a general-purpose computer. Alternatively, controller 1 can be an integrated circuit device such as a processor, microcontroller, Application Specific Integrated Circuit (ASIC) device, or Field Programmable Gate Array (FPGA) device operable to execute instructions contained in one or more software program(s). Controller 1 can be integrated with position determination system 31 as a single unit, or controller 1 and position determination system 31 may be coupled as separate units.

In the present embodiment, controller 1 is coupled to a storage unit 33 and to display unit 28. Storage unit 33 is for storing multiple items of the content 32 (FIG. 1) that are to be displayed on display unit 28. Accordingly, in one embodiment, controller 1 can select from storage unit 33 the appropriate item of content 32, depending on the position and/or direction of travel of mobile vehicle 30 (FIG. 1). In another embodiment, controller 1 can also select the appropriate item of content 32 from storage unit 33 depending on the time of day.

Content 32 can be embodied in storage unit 33 as, for example, a rotating panel that itself is a physical manifestation of content 32, or as magnetic, optical, or electronic data that are converted into a visible display of content 32. In the latter case, storage unit 33 can be a Random Access Memory (RAM) device such as, for example, a Static Random Access Memory (SRAM) device or a Dynamic Random Access Memory (DRAM) device. Alternatively, other types of memory storage devices such as flash memory, Read Only Memory (ROM), tape, CD ROM, or DVD may be used.

It is appreciated that, although the present invention is described for a visual display, the content 32 can also be audibly broadcast in combination with or instead of the display, using either pre-recorded audible messages or any of the various techniques and software programs available for converting text to voice.

Figure 3:
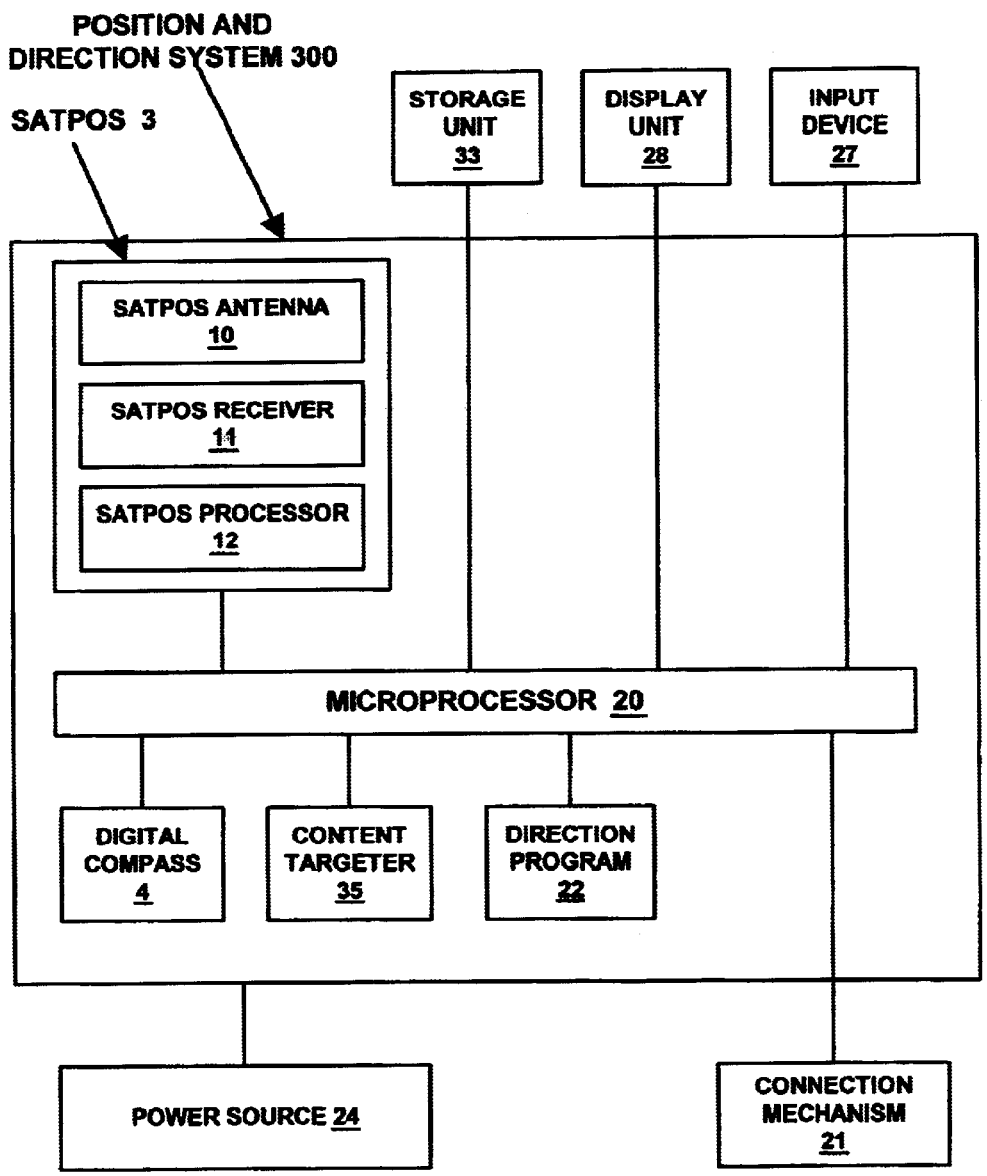
FIG. 3 is a block diagram of one embodiment of an integrated position and direction system for vehicle-based dynamic advertising in accordance with the present invention.

FIG. 3 is a block diagram of one embodiment of an integrated position and direction system 300 for dynamic advertising in accordance with the present invention. Integrated position and direction system 300 is shown to include SATPOS 3 that is operable for determining position. In the present embodiment, SATPOS 3 includes SATPOS antenna 10, SATPOS receiver 11, and SATPOS processor 12.

In one embodiment, SATPOS processor 12 is a GPS processor made by Trimble Navigation, Ltd., of Sunnyvale, Calif. In this embodiment, SATPOS antenna 10 is an ACE II GPS™ antenna, manufactured by Trimble Navigation, Ltd. and SATPOS receiver 11 includes a SIERRA GPS™ chipset, manufactured by Trimble Navigation, Ltd. Although such a specific implementation is described, the present invention is also well suited to an embodiment having various other components and features.

In the present embodiment, microprocessor 20 performs the functions of controller 1 of FIG. 2. In the present embodiment, microprocessor 20 is a general-purpose microprocessor that has low power consumption such as, for example, a Motorola RISC (reduced instruction set computer) microprocessor made by Motorola Inc. of Austin, Tex. Alternatively, another type of processor, an ASIC device or a FPGA device can be used. In another embodiment, SATPOS processor 12 is used for controlling the operations of integrated position and direction system 300 instead of microprocessor 20; accordingly, there may be no need for a second processor such as microprocessor 20.

Storage unit 33 is coupled to microprocessor 20 and is adapted to store content 32 (FIG. 1). Direction program 22 represents a memory unit comprising instructions that are operable on microprocessor 20 and that control the operations of integrated position and direction system 300. Content targeter 35 represents a memory unit comprising instructions that are also operable on microprocessor 20 and that control which item of content 32 is to be displayed on display unit 28, based on the position and/or direction of travel of mobile vehicle 30 (FIG. 1) as determined by integrated position and direction system 300, and/or the time of day. In one embodiment, content targeter 35 monitors (measures) the amount of time a particular item of content 32 is on display. Although shown as separate elements in FIG. 3, it is understood that direction program 22 and content targeter 35 can be combined into a single memory unit.

Continuing with FIG. 3, power source 24 provides power to the various components of integrated position and direction system 300. Power source 24 may be any suitable power source that is light-weight and compact such as, for example, built-in rechargeable batteries, size AA batteries, or size AAA batteries. Alternatively, integrated position and direction system 300 can be powered by mobile vehicle 30 (FIG. 1).

Referring still to FIG. 3, in the present embodiment, connection mechanism 21 is coupled to microprocessor 20 and is adapted to connect to external devices such as, for example, external computer systems. This allows for easily and quickly downloading new programs for operation on microprocessor 20, and also allows for updating of storage unit 33 when content 32 is provided as electronic, magnetic, or optical data. Connection mechanism 21 also allows data to be downloaded from integrated position and direction system 300 to an external computer system. For example, the amount of time an item of content 32 is displayed can be downloaded to an external computer system, which can generate billing information and the like. In one embodiment, connection mechanism 21 is a connector that complies with the RS-232 standard, although other types of connectors known in the art can be used.

In one embodiment, input device 27 is coupled to microprocessor 20 and allows for coupling user input to microprocessor 20. In the present embodiment, input device 27 includes function keys and an alphanumeric keypad. Alternatively, input device 27 includes a trackball, mouse, touch pad, joystick. The present invention is also well suited to receiving user input by other means such as, for example, voice commands.

It is appreciated that, although integrated position and direction system 300 is described as performing functions pertaining to the dynamic targeting of content, these functions can instead be performed by a separate device on board mobile vehicle 30 and coupled to integrated position and direction system 300.

Vehicle-Based Dynamic Advertising

Figure 4:
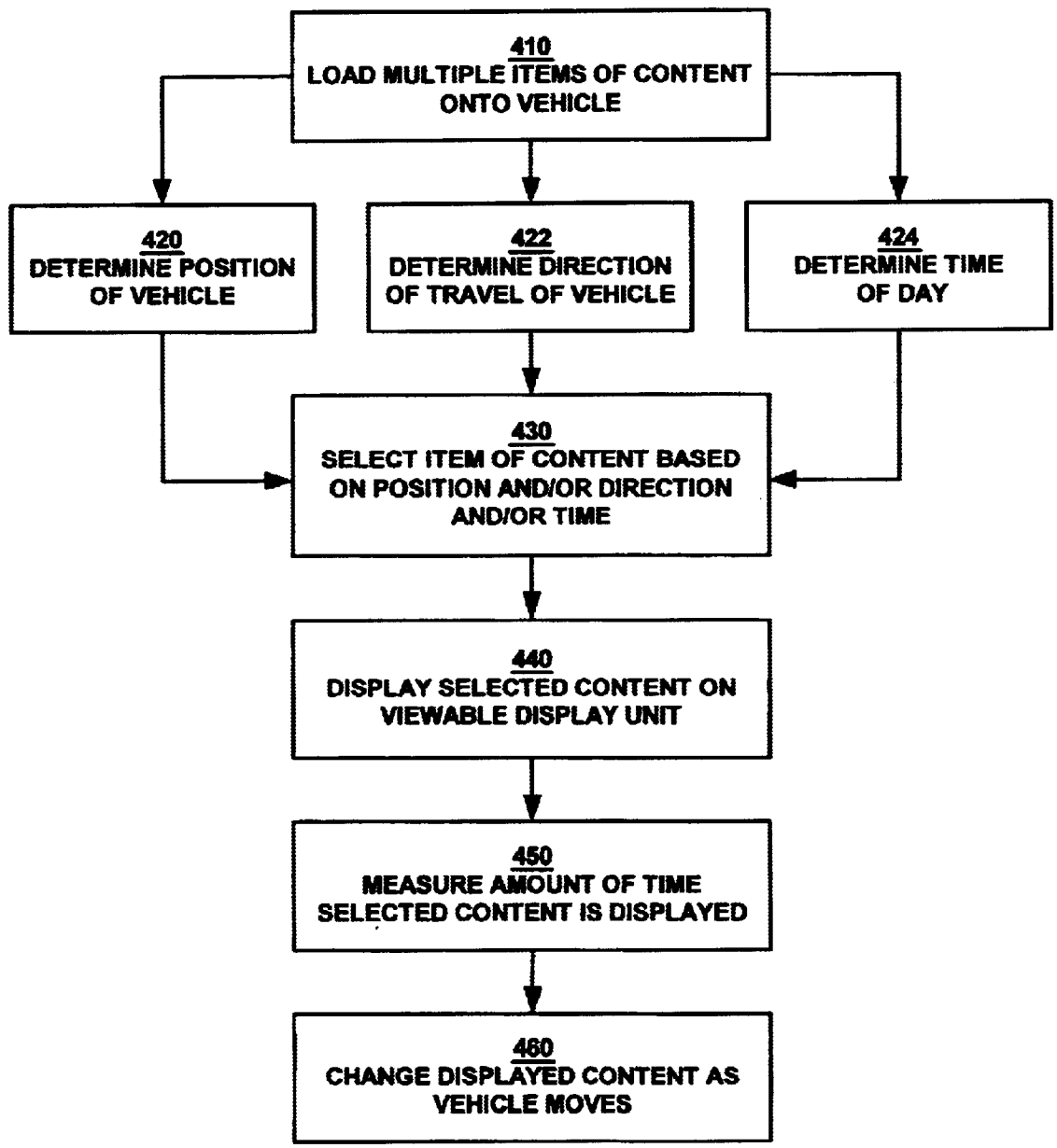
FIG. 4 is a flowchart of the steps in a process for dynamically targeting content using a mobile vehicle in accordance with one embodiment of the present invention.

FIG. 4 is a flowchart of the steps in a process 400 for dynamically targeting content using a mobile vehicle 30 (FIG. 1) in accordance with one embodiment of the present invention. In the present embodiment, process 400 is implemented using elements of integrated position and direction system 300 (FIG. 3), as described below. However, it is appreciated that process 400 can also be implemented using a general purpose computer system (e.g., controller 1) in combination with a SATPOS 3 and/or a digital compass 4 (FIG. 2).

In step 410 of FIG. 4, with reference also to FIGS. 1, 2 and 3, multiple items of content 32 are loaded on board mobile vehicle 30 (specifically, storage unit 33). In one embodiment, content 32 is physically manifested as, for example, rotating panels. In another embodiment, content 32 is manifested as electronic, magnetic or optical data that are loaded into storage unit 33 from, for example, an electronic computer system via connection mechanism 21. At periodic intervals, content 32 can be added to or removed from storage unit 33. That is, for example, at the beginning of each journey or on a daily basis, different content can be incorporated into storage unit 33 depending on the expected route to be taken or the clients placing ads.

In step 420 of FIG. 4, in the present embodiment, the position of mobile vehicle 30 is determined using SATPOS 3 (FIG. 2) or integrated position and direction system 300 (FIG. 3). In one embodiment, process 400 includes step 422, in which the direction of travel of mobile vehicle 30 is determined using digital compass 4 (FIG. 2) or integrated position and direction system 300. In another embodiment, process 400 also includes step 424, in which the time of day is determined.

In step 430 of FIG. 4, a particular item of content 32 is selected based on either the position of mobile vehicle 30, the direction of travel of mobile vehicle 30, the time of day, or some combination thereof. In one embodiment, associated with each item of content is a set of instructions describing the conditions for displaying that item of content; that is, the instructions can specify the location, direction of travel and/or time of day for displaying each item of content 32. It is appreciated that other factors can also be considered when selecting a particular item of content 32 to be displayed. It is also appreciated that, although process 400 is contemplated as occurring automatically, selection of an item of content 32 can be made manually, for example, in response to input received from the operator (driver) of mobile vehicle 30. As such, factors such as the speed of mobile vehicle 30 or the ambient conditions (e.g., weather, amount of traffic, etc.) can also be considered in the selection of the content 32 to be displayed.

In step 440 of FIG. 4, and continuing with reference also to FIGS. 1, 2 and 3, the content 32 selected in step 430 is retrieved from storage unit 33 and displayed on display unit 28. In the present embodiment, display unit 28 is viewable by an audience external to mobile vehicle 30 (that is, content 32 is readily viewable by persons other than the operator of mobile vehicle 30).

In step 450 of FIG. 4, in one embodiment, the amount of time that the selected item of content 32 is displayed is measured and recorded. This information can be subsequently used as, for example, the basis for determining the amount clients are to be billed.

In step 460 of FIG. 4, in accordance with the present invention, as spatial, temporal or other factors change, the content 32 displayed on display unit 28 is dynamically changed from one item to another, as described above in steps 420, 422, 424 and 430. That is, for example, as mobile vehicle 30 moves or changes direction, the content 32 that is displayed is changed en route.

It is appreciated that, although process 400 is described for a visual display, the content 32 can also be audibly broadcast in combination with or instead of the display, using either pre-recorded audible messages or any of the various techniques and software programs available for converting text to voice.

In summary, the present invention provides a method and system that can more effectively target advertisements and other content provided by mobile advertisers. In accordance with the present invention, content (advertisements, messages and the like) can be more precisely targeted by location, direction of travel and/or time of day, as well as other factors, making the content more relevant to the viewing audience and therefore more effective.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A vehicle for dynamically targeting content according to location-based information, said vehicle comprising:
    an integrated position and direction system that resides on board said vehicle and that is adapted to determine a position and a direction of travel of said vehicle, said integrated position and direction system comprising:
        a digital compass adapted to determine said direction of travel using Global Positioning System (GPS) information;
        a satellite positioning system adapted to determine said position using said GPS information, said satellite positioning system comprising an antenna, a receiver and a processor;
        memory comprising a direction program comprising instructions that control operations of said integrated position and direction system;
        memory comprising a content targeter comprising instructions that control selection of an item of content based on said position and said direction of travel; and
    a controller coupled to said digital compass and to said satellite positioning system;

a storage unit coupled to said controller, said storage unit adapted to store multiple items of content on board said vehicle; and a display unit coupled to said storage unit, said display unit adapted to provide a changeable display viewable by an audience external to said vehicle;

wherein said controller selects content from said multiple items of content using said instructions that control selection of an item of content, said content selected according to both said position and said direction of travel; and wherein said content selected according to said position and said direction of travel is displayed on said display unit, wherein said content selected is viewable by said audience external to said vehicle.

2. The vehicle of claim 1 wherein said content selected is also selected according to a time of day.

3. The vehicle of claim 1 wherein said multiple items of content stored on board said vehicle are updated with different content at periodic intervals.

4. The vehicle of claim 1 wherein said controller is also adapted to measure an amount of time said content selected is displayed.

5. A method of dynamically targeting content according to location-based information, said method comprising:

a) determining a position and a direction of travel of a mobile vehicle using an integrated position and direction determination system that resides on board said vehicle and that analyzes satellite-broadcast position determining signals, wherein said integrated position and direction determination system comprises a digital compass for determining said direction of travel using said satellite-broadcast position determining signals, memory comprising instructions that control operations of said integrated position and direction system, memory comprising instructions that control selection of an item of content based on said position and said direction of travel, and a satellite positioning system for determining said position using said satellite-broadcast position determining signals, said satellite positioning system comprising an antenna, a receiver and a processor, said vehicle having a changeable display viewable by an audience external to said vehicle;

b) selecting content from multiple items of content stored on board said mobile vehicle, wherein said content is selected according to said position and also according to said direction of travel; and c) displaying said content selected in step b) on said changeable display, wherein said content selected in said step b) is viewable by said audience external to said vehicle.

6. The method as recited in claim 5 wherein said satellite-broadcast position determining signals comprise Global Positioning System (GPS) information.

7. The method as recited in claim 5 wherein said content selected is also selected according to a time of day.

8. The method as recited in claim 5 wherein said multiple items of content stored on board said mobile vehicle are updated with different content at periodic intervals.

9. The method as recited in claim 5 further comprising:

d) measuring an amount of time said content selected is displayed.

10. A method of dynamically targeting content according to location-based information, said method comprising:

a) loading multiple items of content into a storage unit on board a mobile vehicle;

b) selecting an item of said content according to both a position and a direction of travel of said mobile vehicle and a time of day, said position and said direction of travel determined using an integrated position and direction determination system that resides on board said vehicle and that analyzes satellite-broadcast position determining signals, wherein said integrated position and direction determination system comprises a digital compass for determining said direction of travel using said satellite-broadcast position determining signals, memory comprising instructions that control operations of said integrated position and direction system, memory comprising instructions that control selection of an item of content based on said position and said direction of travel, and a satellite positioning system for determining said position using said satellite-broadcast position determining signals, said satellite positioning system comprising an antenna, a receiver and a processor; and c) displaying said item of said content selected according to said position and said direction of travel on a changeable display viewable by an audience external to said mobile vehicle.

11. The method as recited in claim 10 wherein said satellite-broadcast position determining signals comprise Global Positioning System (GPS) information.

12. The method as recited in claim 10 further comprising:

d) measuring an amount of time said content is displayed.

* * * * *